United States Patent [19]

Ando

[11] Patent Number: 4,766,582

[45] Date of Patent: Aug. 23, 1988

[54] OPTICAL HEAD

[75] Inventor: Hideo Ando, Tokyo, Japan

[73] Assignee: Kabushiki Kaisha Toshiba, Kawasaki, Japan

[21] Appl. No.: 94,024

[22] Filed: Sep. 4, 1987

Related U.S. Application Data

[63] Continuation of Ser. No. 673,764, Nov. 21, 1984, abandoned, which is a continuation of Ser. No. 16,488, Feb. 17, 1987, abandoned.

[30] Foreign Application Priority Data

Nov. 22, 1983 [JP] Japan ................................. 58-219707
Nov. 22, 1983 [JP] Japan ................................. 58-219708
Nov. 22, 1983 [JP] Japan ................................. 58-219709
Nov. 25, 1983 [JP] Japan ................................. 58-221568

[51] Int. Cl.⁴ ............................................. G11B 7/135
[52] U.S. Cl. ...................................... 369/45; 369/46; 369/112; 369/118; 369/120
[58] Field of Search ................... 369/44, 45, 46, 112, 369/117, 118, 121, 122, 110, 120; 250/201 DF

[56] References Cited

U.S. PATENT DOCUMENTS

| | | |
|---|---|---|
| 3,876,841 | 4/1975 | Kramer et al. . |
| 4,074,085 | 2/1978 | Russell ................................. 369/46 |
| 4,079,248 | 3/1978 | Lehureau et al. . |
| 4,115,809 | 9/1978 | Ueno . |
| 4,136,362 | 1/1979 | Naruse et al. .......................... 369/44 |
| 4,253,723 | 3/1981 | Kojima et al. ........................ 369/112 |
| 4,334,300 | 6/1982 | Arquie et al. . |
| 4,344,164 | 8/1982 | Bricot et al. .......................... 369/44 |
| 4,423,495 | 12/1983 | Musha et al. .......................... 369/45 |
| 4,459,690 | 7/1984 | Corsover et al. ...................... 369/44 |
| 4,546,463 | 10/1985 | Opheij et al. ........................ 369/122 |
| 4,562,568 | 12/1985 | Hazel et al. .......................... 369/121 |
| 4,563,058 | 1/1986 | Yardy .................................. 369/112 |
| 4,566,088 | 1/1986 | Yoshida et al. ...................... 369/122 |

FOREIGN PATENT DOCUMENTS 56-41530  4/1981  Japan ................................. 369/112

Primary Examiner—Donald McElheny, Jr.
Attorney, Agent, or Firm—Cushman, Darby & Cushman

[57] ABSTRACT

In an optical head, recording, reproducing and guide laser beams are emitted from semiconductor lasers, and the laser beams are optically mixed by a mixed. The mixed laser beams are converged onto a tracking guide of a recording surface by an objective lens and are reflected from the recording surface. The reflected laser beams are separated into the recording, reproducing and guide laser beams by the beam separator. The recording and guide laser beams are shielded in the beam separator, and only the reproducing laser beam is directed to photodetecting regions of information, tracking error and defocus detectors.

25 Claims, 8 Drawing Sheets

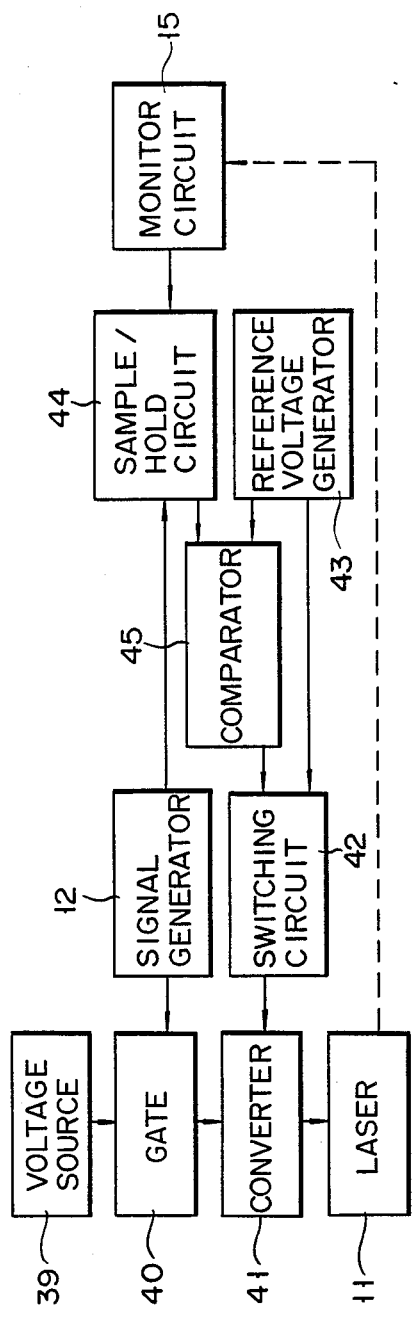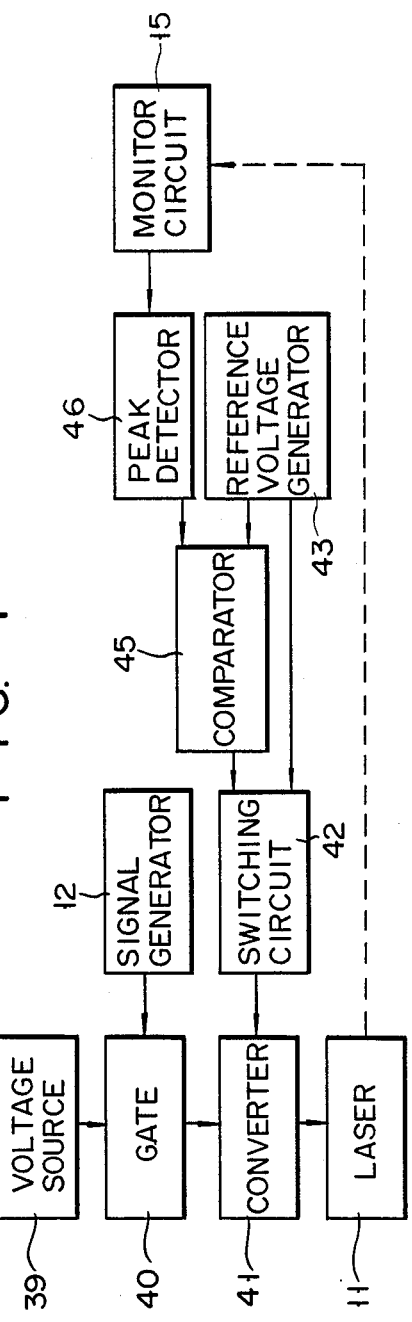

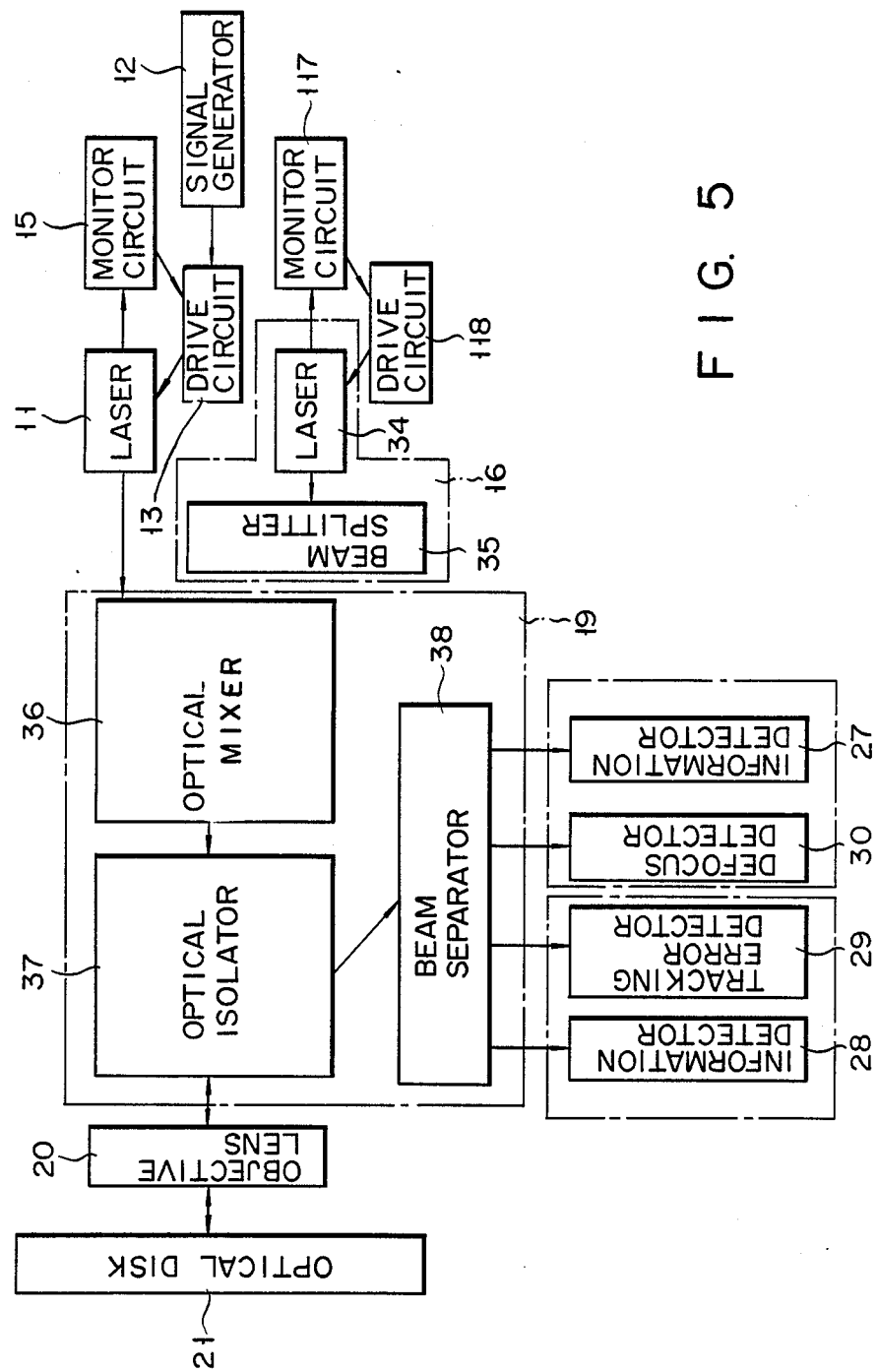
F I G. 5

OPTICAL HEAD

This is a continuation of application Ser. No. 673,764, filed Nov. 21, 1984, now abandoned. This is also a continuation of 016,488 filed Feb. 17, 1987, which was abandoned upon the filing hereof.

BACKGROUND OF THE INVENTION

The present invention relates to an optical head for focusing light beams for information reproduction and recording or information reproducing, recording and erasing to form a beam spot on an information recording medium. More particularly, this relates to an optical head for recording, reproducing or erasing information from the optical disk by using a plurality of light beams.

Different optical heads for recording/reproducing information using the medium of an optical disk have been recently developed and are commercially available. To record information, a region on a recording surface is irradiated with a beam spot of an intensity-modulated light beam formed by an objective lens, and this beam continuously changes the characteristic of the disk while the optical disk is continuously rotated. Apertures called pits are formed in the disk, or optical characteristics such as a refractive index and a reflectance are changed in order to record information in the recording surface of the optical disk. To reproduce information, a reproduction laser beam is focused by the objective lens to form a beam spot on the recording region, and the reproduction light beam is intensity-modulated by the state of the recording area. The reproduction beam is converted by a photodetector to an electrical signal.

A conventional optical head is already known wherein information is recorded in the optical disk while simultaneously confirming whether or not information is being properly recorded in the optical disk. Thus, the reproduction light beam is focused on the optical disk even in the recording mode. In addition, another conventional optical head is known wherein a tracking guide is provided to specify an information recording area. In the optical head having the tracking guide wherein information is recorded while confirming whether or not information is properly recorded in the optical disk, the light beam must always trace the tracking guide. For this purpose, a tracking guide detection system is arranged in the optical head. However, in the recording mode, since the recording/reproduction light beam is reflected from the optical disk, the tracking guide cannot be stably detected, resulting in inconvenience.

In the optical head for recording, reproducing and erasing information, detection of the tracking guide may be affected by an erasing light beam during an erasing mode.

SUMMARY OF THE INVENTION

It is an object of the present invention to provide an optical head capable of properly recording, reproducing or erasing information with respect to an optical disk.

In order to achieve the above object of the present invention, there is provided an optical head, for recording/reproducing information with respect to a recording surface subjected to information recording/reproduction, comprising:

a light source having at least two light emitting points separated from each other, for generating first and second light beams;

optical means for multiplexing the first and second light beams and transmitting multiplexed light beams substantially along a single optical path;

an objective lens for focusing the multiplexed light beams toward the recording surface;

separating means for separating the multiplexed light beams reflected from the recording surface into the first and second light beams; and detecting means for detecting the separated first light beam.

BRIEF DESCRIPTION OF THE DRAWINGS

FIG. 3 is a block diagram showing the detailed arrangement of a recording laser driver circuit shown in FIG. 1;

FIG. 4 is a block diagram showing a modification of the recording laser driver shown in FIG. 3;

FIG. 5 is a block diagram showing the detailed arrangement of an optical head shown in FIG. 1;

DETAILED DESCRIPTION OF THE PREFERRED EMBODIMENT

Figure 1:
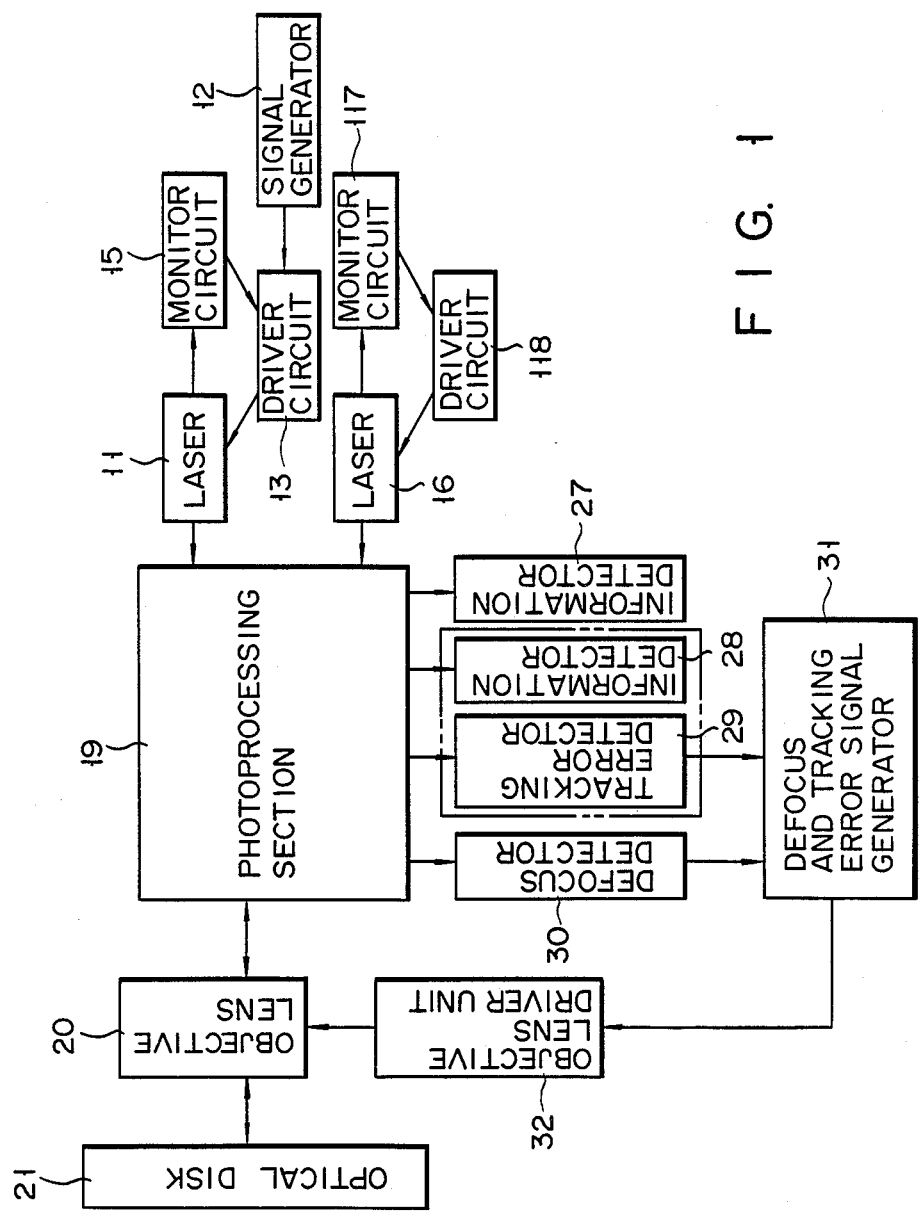
FIG. 1 is a block diagram schematically showing an optical head according to the present invention.

FIG. 1 is a block diagram of an optical head according to an embodiment of the present invention. In this optical head, a recording laser, e.g., a semiconductor laser 11, is driven by a recording laser driver circuit 13 in response to a recording signal from a recording signal generator 12 in the recording mode. A laser beam from the recording laser 11 is intensity-modulated in response to the recording signal. The modulated recording laser beam is supplied to a photoprocessing section 19 for mixing a plurality of light beams and separating the mixed light beams. The recording laser 11 also generates a monitor laser beam in addition to the recording laser beam. The monitor laser beam is converted by a monitor circuit 15 to an electrical signal. This electrical signal is fed back as a feedback signal to the recording laser driver circuit 13. Therefore, recording laser 11 generates an intensity-modulated recording laser beam having a given intensity level.

The photoprocessing section 19 receives the reproduction and guide laser beams of the given constant level generated from a reproduction and guide laser 16 which is operated by a reproduction and guide laser driver circuit 118 in both the reproduction and recording modes. The laser 16 comprises a semiconductor device having two semiconductor laser structures formed on a semiconductor substrate and light emitting points spaced by a short distance from each other. The laser 16 also generates the monitor laser beam in addition to the reproduction and guide laser beams. The monitor laser beam is converted to an electrical signal by a reproduction and guide monitor circuit 117. This electrical signal is fed back as a feedback signal to the laser driver circuit 118. Therefore, the reproduction and guide laser 16 generates the reproduction and guide laser beams having a given constant intensity level.

Figure 2:
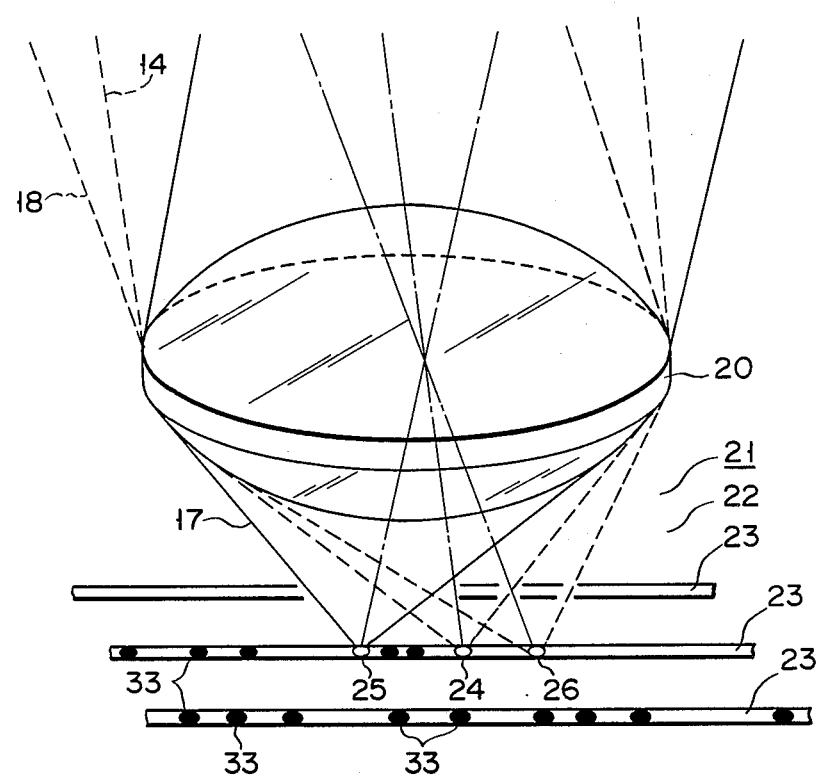
FIG. 2 is a perspective view showing a path of a laser beam in an objective lens system shown in FIG. 1.

The recording, reproduction and guide beams are mixed by the photoprocessing section 19 in the recording mode. The reproduction and guide laser beams are mixed by the photoprocessing section 19 in the reproduction mode. The mixed laser beams in the recording and reproduction modes are transmitted through a single optical path and are incident on the objective lens 20. As shown in FIG. 2, the mixed laser beam is focused by the objective lens 20 to form a beam spot on the light-reflecting surface (i.e., a recording surface 22) of the optical disk 21 which is subjected to recording/reproduction. In the recording mode, when the objective lens is held in the in-focus state, recording, reproduction and guide spots 24, 25 and 26 corresponding to the recording, reproduction and guide laser beams are formed on a tracking guide 23 on the recording surface 22 at short intervals. In the reproduction mode, when the objective lens is held in the in-focus state, reproduction and guide beam spots 25 and 26 corresponding to the reproduction and guide laser beams are formed on the tracking guide 23 on the recording surface 22 at a short interval. When the optical disk 21 is rotated, the respective areas on the tracking guide 23 are sequentially traced in an order of the guide beam spot 26, the recording beam spot 24 and the reproduction beam spot 25. When the intensity of the recording laser beam exceeds a predetermined level, a characteristic change (e.g., formation of a pit or change of the optical characteristics such as a refractive index or a reflectance) occurs in the recording surface area on which the recording beam spot is formed. In this manner, the pit is formed on the recording surface in accordance with recording information, or the optical characteristics of the recording surface change. When the reproduction laser beam of a given constant level irradiates the recording surface 22, and the reproduction beam spot 25 traces the tracking guide 23, the reproduction beam is intensity-modulated in the area where the pit is formed or the optical characteristics such as a refractive index or reflectance will change. When the guide beam spot reaches an area where supplementary information concerning track positions and sector positions is recorded as pits 33, the guide laser beam is intensity-modulated.

The laser beam reflected by the recording surface 22 passes through the objective lens 20 and is incident on the photoprocessing section 19. The laser beam is separated by the photoprocessing section 19 into the recording laser beam, the reproduction laser beam and the guide laser beam. The recording laser beam is attenuated or shielded. The reproduction laser beam is converted to an electrical signal. This electrical signal is supplied to an information detector 28 for reproducing information recorded in the recording surface 22 of the optical disk 21, a defocusing detector 30 for detecting a defocused state of the objective lens 20, and a photodetector in a tracking error detector 29 for detecting whether the laser beam properly traces the tracking guide 23. The guide laser beam is also incident on a photodetector of a supplementary information detector 27 for reproducing supplementary information (concerning the track positions and the sector positions) recorded on the recording surface 22 of the optical disk 21. Signals from the defocus detector 30 and the tracking error detector 29 are supplied to a defocus and tracking error signal generator 31 to convert into a defocus signal and a tracking error signal which are supplied to an objective lens driver unit 32. The objective lens driver unit 32 moves the objective lens 20 along the optical axis thereof and moves the objective lens 20 in a direction perpendicular to the tracking guide. The objective lens 20 is thus maintained in the in-focus state and is oriented in a direction so as to cause the laser beam to properly trace the tracking guide.

The recording laser driver 13 has the detailed arrangement shown in FIG. 3. The recording laser 11 is connected to a constant voltage source 39 through a gate 40 and a current/voltage converter 41. The current/voltage converter 41 is connected to a switching circuit 42. The switching circuit 42 is operated to connect a reference voltage generator 43 to the current/voltage converter 41 when the recording laser 11 is driven. The current/voltage converter 41 is operated by a reference voltage applied from the reference voltage generator 43 when the recording laser driver circuit 13 is driven. The gate 40 is connected to the recording signal generator 12 and is enabled/disabled in response to the recording signal generated therefrom. A light intensity modulating voltage is converted by the current/voltage converter 41 to a current signal. The current signal is supplied to the recording laser 11. The recording laser 11 generates a laser beam in accordance with the recording signal. The switching circuit 42 is operated to connect the current/voltage converter 41 to a comparator 45 after the recording laser driver circuit 13 is started. The recording signal generator 12 is also connected to a sample/hold circuit 44. The sample/hold circuit 44 is connected to a monitor circuit 15 for monitoring the laser beam generated from the recording laser 11. Therefore, every time the ON signal is generated from the recording signal generator 12, a monitor output from the monitor circuit 15 is sampled by the sample/hold circuit 44. In other words, every time the laser beam is generated from the recording laser 11, the light intensity is sampled. The sample output is compared by the comparator 45 with the reference voltage from the reference voltage generator 43. A comparison result is supplied to the current/voltage converter 41 through the switching circuit 42. The current flowing from the current/voltage converter 41 to the recording laser 11 is adjusted such that the output laser beam from the recording laser 11 remains constant.

As shown in FIG. 4, a peak detector may be used in place of the sample/hold circuit 44 of FIG. 3. In this case, a peak of the monitor output from the monitor circuit 15 may be sampled by the peak detector 46.

Figure 6:
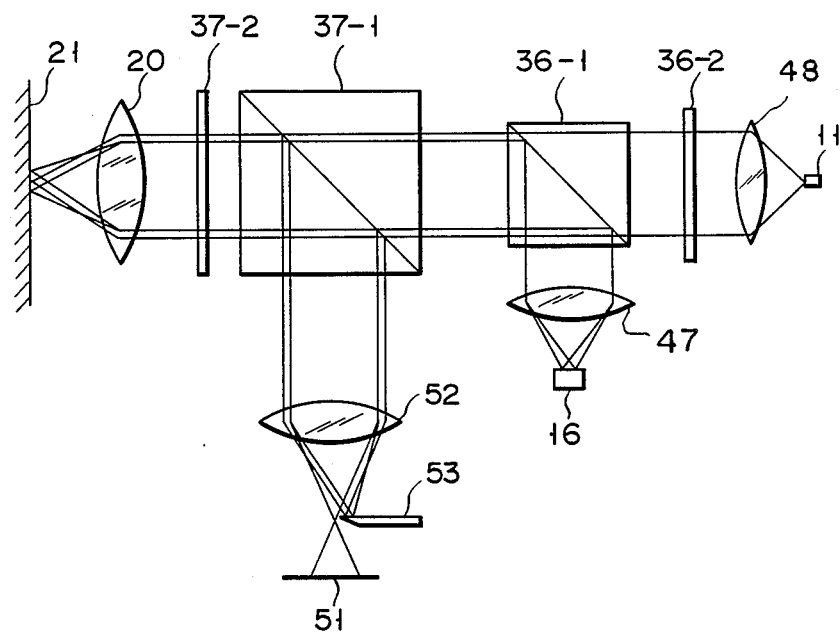
FIG. 6 is a schematic view showing an optical system of the optical head shown in FIG. 5.

A laser 34 for generating a single laser beam, as shown in FIG. 5, may be used in place of the reproduction and guide laser 16 shown in FIG. 1. In this case, the laser beam is split by a beam splitter 35 such as a biprism into the reproduction and guide laser beams. As shown in FIG. 5, the photoprocessing section 19 comprises an optical mixer 36 for mixing a plurality of laser beams, an optical isolator 37 for preventing the laser beam from returning to the lasers 15 and 34, and a laser beam separator 38 for separating the mixed laser beams. More specifically, as shown in FIG. 6, the optical mixer 36 comprises a dichroic prism 36-1 and a filter 36-2. The optical isolator 37 comprises a polarizing beam splitter 37-1 and a λ/4 plate 37-2. The laser beam separator 38 comprises a knife edge 53. In an optical system shown in FIG. 6, the reproduction and guide laser beams from the reproduction and guide laser 16 are collimated by a collimator lens 47. A collimated light beam is incident on the dichroic prism 36-1. The reproduction and guide laser beams have a wavelength of 780 nm. This laser beam passes through the dichroic prism 36-1 and is incident on the polarizing beam splitter 37-1. The recording laser beam emitted from the recording laser 11 is collimated by a collimator lens 48 in the same manner as described above. A collimated laser beam is incident on the dichroic prism 36-1. The recording laser beam has a wavelength of 830 nm. Like the reproduction and guide laser beams, the recording laser beam is reflected by the dichroic prism 36-1 and is incident on the polarizing beam splitter 37-1 through the same optical path as the reproduction and guide laser beams. The recording, reproduction and guide laser beams generated from the polarizing beam splitter 37-1 are incident on the objective lens 20 through the λ/4 plate and are focused by the objective lens 20 to form the corresponding recording, reproduction and guide beam spots 24, 25 and 26 on the recording surface 22. The laser beams reflected by the recording surface 22 are incident on the polarizing beam splitter 37-1 through the objective lens 20 and the λ/4 plate 37-2. When the laser beam reciprocates through the λ/4 plate 37-2, the plane of polarization of the laser beam is rotated through 90 degrees. As a result, the laser beam is reflected by the polarizing beam splitter 37-1. The recording, reproduction and guide laser beams reflected by the polarizing beam splitter 37-1 are focused by a projection lens 52 and are separated by the knife edge 53 into the recording, reproduction and guide laser beams. The recording laser beam is attenuated, reflected or shielded by the knife edge 53. The reproduction laser beam is incident on the information detector 28, the defocus detector 30 and the photodetector 51 of the tracking error detector 29. The guide laser beam is incident on the photodetector 54 of the supplementary information detector 27.

Figure 7:
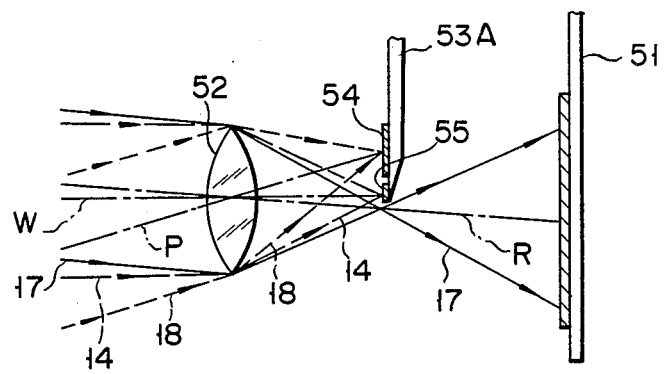
FIGS. 7 and 8 are respectively a side view and a perspective view of an optical system for separating multiplexed laser beams into a recording laser beam, a reproduction laser beam and a guide laser beam.
Figure 8:
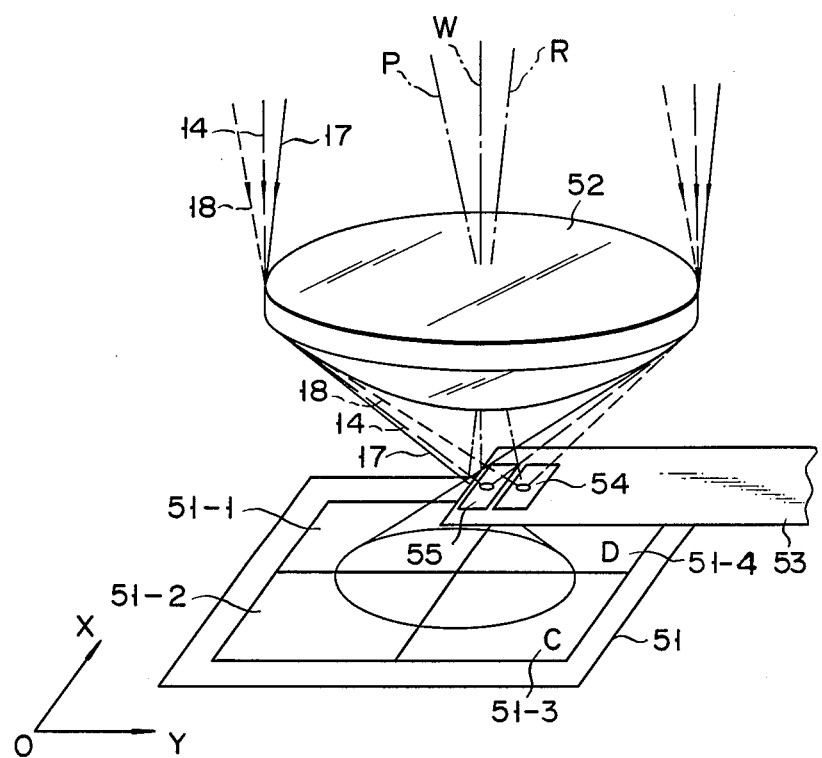

An optical system for separating the multiplexed laser beam into the recording, reproduction and guide laser beams will be described in detail with reference to FIGS. 7 and 8. In the arrangement shown in FIGS. 7 and 8, the knife edge or the light-shielding plate 53A is located in beam waists of the recording, reproduction and guide laser beams which are determined by the projection lens 52 in the in-focus state. The beam waists of the recording and guide beams are formed on the knife edge or the light-shielding plate 53A. More specifically, the knife edge is inserted from the Y direction and extends along the X direction in such a manner that the edge is aligned with the optical axis of the projection lens 52. The Y direction is defined as a direction along which an image of the tracking guide of the optical disk extends when it is projected to the photodetector 51 by an optical system arranged between the recording surface 22 (i.e., the light-reflecting surface) of the optical disk 21 and the photodetector 51. The X direction is defined as a direction perpendicular to the Y direction. As previously described, the recording, reproduction and guide laser beams are focused to form the beam spots 24, 25 and 26 on the tracking guide 23 of the recording surface 22 at very short intervals when the objective lens is held in the in-focus state. A recording laser beam 14, a reproduction laser beam 17 and a guide laser beam 18 which are reflected by the areas having the beam spots 24, 25 and 26 and are transmitted to the projection lens 52 through the objective lens 20 are not parallel to main light beams W, R and P but are inclined with respect thereto, as shown in FIGS. 7 and 8, respectively. Therefore, beam waists are formed at different positions on the focal surface of the projection lens 52. Since the knife edge or light-shielding plate 53A is positioned such that the recording and guide beam spots are formed on the knife edge or light-shielding plate 53A, only the reproduction laser beam 17 is incident on the defocus detector 30, the information detector 28, and the photodetector 51 of the tracking error detector 29. Therefore, the photodetector 51 detects the recording signal representing information, the defocus signal representing the defocused state, and the tracking signal representing a tracking error.

In the arrangement shown in FIGS. 7 and 8, a nondetecting portion or a light-attenuating portion 55 is formed on a portion of the knife edge or light-shielding plate 53A which has the recording beam spot in the in-focus state. A photodetector 54 of the supplementary detector 27 for detecting the guide laser beam is arranged on a portion of the knife edge or light-shielding plate 53A on which the guide beam spot is formed in the in-focus state. The recording laser beam is shielded or attenuated by the nondetecting portion of light-shielding plate 53A. In this case, the guide laser beam is converted by the photodetector 54 to a supplementary information electrical signal representing the track and sector positions.

The photodetector 51 acting as the defocus detector 30, the information detector 28 and the tracking error detector 29 has first, second, third and fourth photodetecting regions 51-1, 51-2, 51-3 and 51-4. The photodetecting regions 51-1 and 51-4 are arranged along the Y direction, and photodetecting regions 51-2 and 51-3 are also arranged along the Y direction. The photodetecting regions 51-1 and 51-2 are arranged along the X direction and the photodetecting regions 51-3 and 51-4 are also arranged along the X direction. The four rectangular photodetecting regions 51-1, 51-2, 51-3 and 51-4 are formed such that the main light ray R of the reproduction laser beam 17 passes through the intersection of these regions. In the photodetector 51, first, second, third and fourth detection signals having levels L1, L2, L3 and L4 are generated from the photodetecting regions 51-1, 51-2, 51-3 and 51-4, respectively.

The reproduction signal is obtained by adding the first, second, third and fourth detection signals having the levels L1, L2, L3 and L4 reproduced from the photodetecting regions 51-1, 51-2, 51-3 and 51-4, thereby obtaining a sum signal (L1+L2+L3+L4) and hence reproducing the information recorded in the recording surface 22 of the optical disk 21.

The defocus detection signal is generated such that the first and second detection signals are added by the adder to obtain a sum, the third and fourth detection signals are added by another adder to obtain a sum, and a difference between these sums is obtained by an operational amplifier. In other words, the defocus signal is generated by a difference signal {(L1+L2)−(L3+L4)}.

When the objective lens 20 is held in the in-focus state wherein the minimum beam spot corresponding to the beam waist of the laser beam focused by the objective lens 20 is formed on the recording surface 22 of the optical disk 21, the beam waist of the reproduction laser beam 17 formed by the projection lens 52 is located in the vicinity of the knife edge 53A, as shown in FIG. 8. As a result, the defocus detection signal {(L1+L2)−(L3+L4)} is substantially zero. However, when the objective lens is moved away from the optical disk 21 and is held in the defocused state, the beam waist of the reproduction laser beam is formed by the projection lens 52 between the knife edge 53A and the projection lens 52. As a result, the defocus detection signal {(L1+L2)−(L3+L4)} does not become zero but represents a positive value. Conversely, when the objective lens 20 comes closer from the in-focus position to the optical disk 21 in the defocused state, the beam waist of the reproduction laser beam 17 is formed by the projection lens 52 between the knife edge 53A, and the photodetector 51. As a result, the defocus detection signal {(L1+L2)−(L3+L4)} does not become zero but represents a negative value. When this defocus detection signal is supplied to the objective lens driver unit 32, the objective lens 20 is always maintained in the in-focus state.

The tracking error signal is obtained such that the first and fourth detection signals are added by an adder, the second and third detection signals are added by an adder, and a difference between the sums from these adders is amplified by an operational amplifier. In other words, the tracking error signal is produced as a difference signal {(L1+L4)−(L2+L3)}.

When the laser beam properly traces the tracking guide, the objective lens 20 is operated such that a diffraction pattern of the tracking guide 23 is formed on a light-receiving surface of the photodetector 51 in a symmetrical manner about an axis of the photodetector 51 parallel to the Y-axis. Therefore, the tracking error signal {(L1+L4)−(L2+L3)} is substantially zero. However, when the laser beam does not properly trace the tracking guide, the diffraction pattern of the tracking guide 23 is formed on the light-receiving surface of the photodetector 51 in an asymmetrical manner about the axis of the photodetector 51 parallel to the Y-axis. Then, the tracking error signal {(L1+L4)−(L2+L3)} does not become zero but represents a negative or positive value. This tracking error signal is supplied to the objective lens driver unit 32, the objective lens 20 is oriented such that the laser beam therefrom properly traces the tracking guide.

Figure 9:
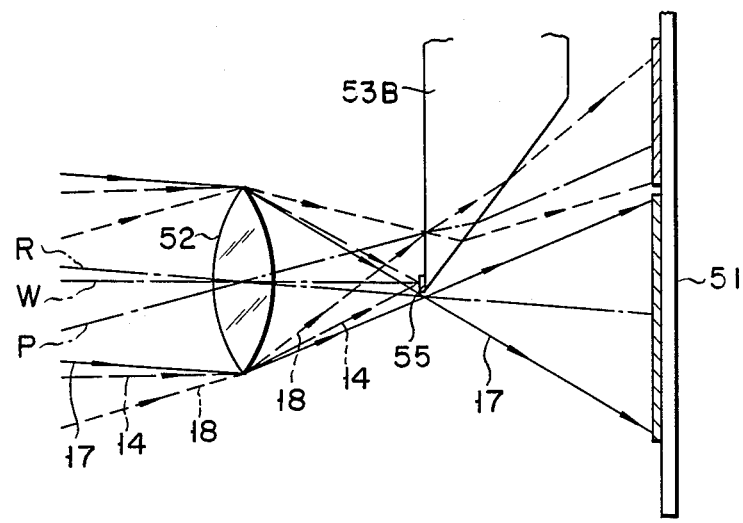
FIGS. 9, and 10 are respectively a side view and a perspective view showing another arrangement of an optical system for separating the multiplexed laser beams into a recording laser beam, a reproduction laser beam and a guide laser beam.
Figure 10:
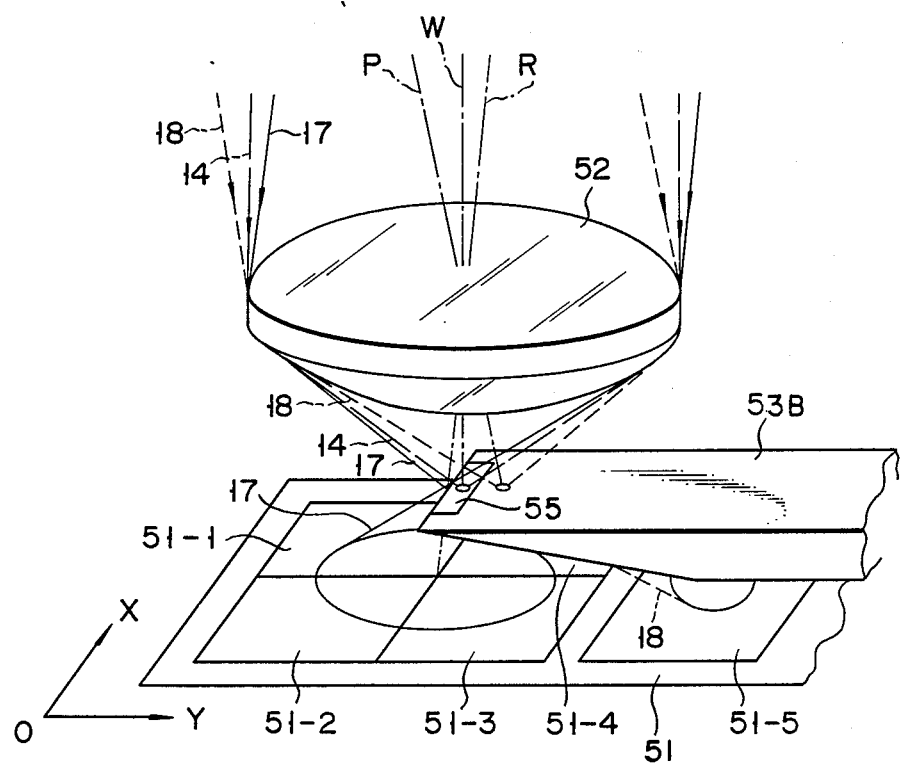

Instead of the arrangement shown in FIGS. 7 and 8, an optical system for separating the mixed laser beam into the recording laser beam, the reproduction laser beam and the guide laser beam may be arranged as shown in FIGS. 9 and 10. Referring to FIGS. 9 and 10, a prism 53B is used in place of the knife edge or light-shielding plate 53A. In the same manner as in the arrangement of FIGS. 7 and 8, the upper surface of the prism 53B is aligned with a focal plane of the recording, reproduction and guide laser beams projected by the projection lens 52 in the in-focus state, and the beam waists of these beams are formed on the prism 53B. In other words, the prism 53B is inserted from the Y direction and extends along the X direction such that the edge of the prism is aligned with the optical axis of the projection lens 52. In addition, an undetecting portion or light-attenuating portion 55 is formed on the upper surface region of the prism 53B which has the recording beam spot in the in-focus state. As shown in FIG. 10, the photodetector 51 has a rectangular fifth photodetecting region 51-5 of the supplementary detector 27 for detecting the guide laser beam, in addition to the first, second, third and fourth photodetecting regions 51-1, 51-2, 51-3 and 51-4.

In the arrangement shown in FIGS. 9 and 10, the recording laser beam 14, the reproduction laser beam 17 and the guide laser beam 18 are focused on the focusing surface of the projection lens 52 at different positions. Since the prism 53B is located such that the recording and guide beam spots are formed on the upper surface thereof, only the reproduction laser beam 17 irradiates the first, second, third and fourth photodetecting regions 51-1, 51-2, 51-3 and 51-4 of the photodetector 51. The recording signal, the defocus signal and the tracking signal can be obtained by the first, second, third and fourth photodetecting regions 51-1, 51-2, 51-3 and 51-4 of the photodetector 51. The undetecting portion on the upper surface of the prism 53B has the light-attenuating portion 55, so that the recording laser beam is shielded or attenuated by the undetecting or light-shielding portion 55. Furthermore, the guide laser beam is focused on the upper surface of the prism and is refracted by the prism 53B, so that the refracted laser beam is directed toward the fifth photodetecting region 51-5. Therefore, the guide laser beam is converted by the fifth photodetecting region 51-5 to supplementary information electric signals concerning the track and sector positions.

In the optical system in FIGS. 9 and 10, the photodetector 51 has the first, second, third and fourth photodetecting regions 51-1, 51-2, 51-3 and 51-4 for detecting the reproduction laser beam 17 and the fifth photodetecting region 51-5 for detecting the guide laser beam. As a result, the optical system can be easily assembled.

Figure 11:
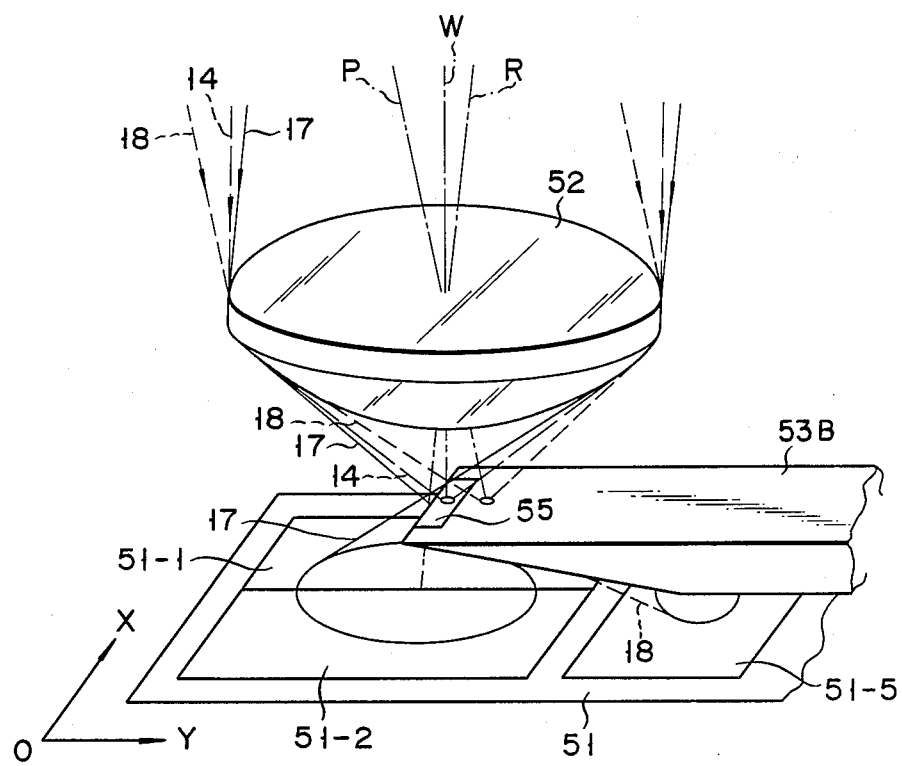
FIG. 11 is a perspective view showing still another arrangement of an optical system for separating the multiplexed laser beams into a recording laser beam, a reproduction laser beam and a guide laser beam.

In the above arrangement, the defocus signal and the tracking signal are detected by the photodetector 51. However, only the tracking signal may be detected by the photodetector 51. In this case, the defocus signal can be detected by another optical system. A half prism is arranged between the polarizing beam splitter 37-1 and the projection lens 52. The recording and guide laser beams are split for two systems. One laser beams are incident on the defocus detector 30, and the other laser beams are incident on the system shown in FIG. 11. The optical system shown in FIG. 11 is the same as that in FIG. 10, except that the photodetector 51 illustrated in the latter has only the tracking detection regions 51-1 and 51-2. In the optical system shown in FIG. 11, the photodetecting regions 51-1 and 51-2 aligned in the X direction detect the tracking signal, and the fifth photodetecting region 51-5 detects supplementary information concerning the track and sector positions.

In the above embodiment, only the reproducing laser beam is directed to the photodetector 51 and the recording and guide laser beam are incident on the knife edge 53A. However, if the knife edge 53A has a mirror surface, only the reproducing laser beam may be incident on the mirror surface of the knife edge 53A and the reproducing laser beam reflected from the mirror surface may be directed to the photodetector 51.

In the above embodiment, the reproduction laser beam is used to cause the photodetector 51 to generate a tracking signal and a focusing signal. However, the guide laser beam may be used to cause the photodetector to generate a tracking signal and a focusing signal.

Furthermore, present invention can be applied to an optical head for information reproducing, recording and erasing in which information can be erased. In this optical head, reproducing, recording and erasing laser beams or recording and erasing laser beams are multiplexed and separated into respective laser beam by the photoprocessing section 19.

According to the optical head of the present invention as has been described in detail, information can be stably and properly recorded/reproduced with respect to the optical disk. At the same time, stable tracking and focusing can be achieved.

What is claimed is:

1. An optical head for recording/reproducing information with respect to a recording surface subjected to information recording/reproduction, comprising:
   means for emitting at least first and second light beams;
   optical means for transmitting said first and second light beams;
   objective lens means for converging said first and second light beams transmitted from said optical means toward said recording surface;
   converging means for obtaining said first and second light beams from said recording surface and converging said first and second light beams obtained from said recording surface so as to cause said second light beam to be spatially separate from said first light beam, a converged first light beam forming a light beam spot of minimum size at a location of a first plane spatially separate from said second light beam;
   detecting means for detecting said first light beam, and having first and second photosensitive regions separated from each other; and
   light beam-separating means, substantially located in said first plane for allowing only said first light beam to impinge on said detecting means.

2. An optical head according to claim 1, wherein said light beam-separating means includes attenuator means for attenuating said second light beam to select said first light beam.

3. An optical head according to claim 1, wherein said light beam-separating means is a reflecting plate which reflects said first light beam toward said detecting means.

4. An optical head according to claim 1, wherein said light beam-separating means includes redirecting means for directing said first light beam to said detecting means and for directing said second light beam in another direction away from said detecting means.

5. An optical head according to claim 4, wherein said light beam redirecting means is a light refraction body having a surface arranged on a focal surface on which beam waists of the light beams are formed.

6. An optical head according to claim 1, wherein said optical head further includes means for moving said objective lens along an optical axis thereof so as to maintain said objective lens in an in-focus state in which beam spots corresponding to beam waists of said like beams projected by said objective lens are formed on the recording surface.

7. An apparatus as in claims 1 further comprising second detector means, mounted on said light beam-separating means.

8. An apparatus as in claim 1 wherein said light beam-separating means includes a light shielding plate which has an edge surface that is adapted to be located adjacent said light beam spot of minimum size.

9. An optical head according to claim 1, wherein said emitting means has first, second and third light emitting points, said first point generating said first beam, said second point generating said second beam, and the third point generating a third, guide light beam.

10. An optical head according to claim 9, wherein said recording surface has a tracking guide defining a region for recording information, said tracking guide having a region for recording supplementary information concerning a track position and a sector position, and said optical head further comprises means for directing the light beams focused by said objective lens toward said tracking guide.

11. An optical head according to claim 10, further comprising photodetecting means for detecting said guide light beam and converting said detected guide light beam into a supplementary signal indicating said track position and said sector position.

12. An optical head according to claim 11, wherein said light beam-separating means comprises a projection lens for focusing the light beams and projecting the focused light beams toward said detecting means, and a light beam-shielding plate, arranged on a focal surface on which beam waists of the light beams are formed, for allowing said first beam to direct toward said detecting means, and said photodetecting means for detecting said guide light beam being arranged on said light shielding plate.

13. An optical head according to claim 11, wherein said converging means comprises a projection lens for focusing the light beams and projecting the focused light beams toward said detecting means, and said light beam-separating means comprises a light refraction body having a focal surface on which beam waists of the light beams are formed for selecting said first light beam and selecting said guide light beam, refracting said guide light beam toward said photodetecting means, and directly projecting said first light beam toward said detecting means.

14. An apparatus as in claim 10 wherein said guide light beam first traces said recording surface and said tracking guide before said first and second beams trace said recording surface.

15. An optical head as in claim 1 further comprising moving means for moving a location of said objective lens means in order to form a focussed image.

16. An optical head according to claim 15, wherein said recording surface includes a tracking guide defining a region for recording information; said optical head further includes:
   means for directing the light beams focused by said objective lens toward said tracking guide;
   and wherein said detecting means further includes third and fourth photosensitive regions, separated from said first and second photosensitive regions, said regions generating first, second, third, and fourth detection signals, said first and third photosensitive regions, and said second and fourth photosensitive regions, respectively, being aligned in an extended direction of the image of said tracking guide formed thereon by an optical system interposed between said regions and said recording surface, said third and fourth photosensitive regions being aligned in a direction perpendicular to said extended direction of the image of said tracking guide;
   said directing means being actuated in response to a tracking signal corresponding to a difference between a sum of said detection signals from said first and third photosensitive regions and a sum of said detection signals from said second and fourth photosensitive regions; and said moving means is actuated in response to a focusing signal corresponding to a difference between a sum of said detection signals from said first and second photosensitive regions and a sum of said detection signals from said third and fourth photosensitive regions.

17. An optical head according to claim 16, wherein said converging means comprises projection lens for focusing the light beams and projecting the light beams toward said detected means, and said light beam-separating means comprises a light shielding plate having an edge surface and arranged on a focal surface on which beam waists of the light beams are formed, for shielding said second beam and projecting said first light beam toward said detecting means.

18. An optical head according to claim 17, wherein said edge of said light-shielding plate extends in the direction perpendicular to said extended direction of the image of said tracking guide.

19. An optical head according to claim 16, wherein said light beam-separating means includes projection lens means for focusing the light beams and projecting the focused light beams toward said detecting means, and a light refraction body having an edge and a surface located on a focal plane on which beam waists of the beams are formed, said light refraction body refracting the second light beam, and directly projecting the first light beam toward said detecting means.

20. An optical head for recording/reproducing information with respect to a recording surface subjected to information recording/reproduction, comprising:
   means for emitting at least first and second light beams;
   optical means for transmitting said first and second light beams;
   objective lens means for converging said first and second light beams transmitted from said optical means toward said recording surface;
   converging means for obtaining said first and second light beams from said recording surface and converging said first and second light beams obtained from said recording surface, said converged first light beam forming a light beam spot of minimum size at a location of a first plane;
   a refractor body substantially located in said first plane in a location to allow at least a part of said first light beam to pass around said refractor body, and said second light beam to pass through said refractor body to be refracted, thereby selecting said first light beam from said first and second light beams; and
   detecting means for detecting said selected first light beam, said detecting means located so that only light passed around said refractor body, and not light refracted by said refractor body, will impinge thereon, and having first and second photosensitive regions separated from each other.

21. An optical head according to claim 20, wherein said refractor body comprises a prism.

22. An optical head according to claim 20, wherein the light beams have different wavelengths, and said refractor means comprises a dichroic prism which reflects said first light beam of a first predetermined wavelength and said transmits said second light beam of a second predetermined wavelength.

23. An optical head as in claim 20 further comprising moving means for moving a location of said objective lens means in order to form a focussed image.

24. An optical head according to claim 23, wherein said recording surface has a tracking guide defining a region for recording information; said optical head further includes:
   means for directing the light beams focused by said objective lens toward said tracking guide;
   and wherein said detecting means further includes third and fourth photosensitive regions, separated from said first and second photosensitive regions, said regions generating first, second, third and fourth detection signals, said first and third photosensitive regions, and said second and fourth photosensitive regions, respectively, being aligned in an extended direction of the image of said tracking guide formed thereon by an optical system interposed between said regions and said recording surface, said third and fourth photosensitive regions being aligned in a direction perpendicular to said extended direction of the image of said tracking guide;
   said directing means being actuated in response to a tracking signal corresponding to a difference between a sum of the detection signals from said first and third photosensitive regions and a sum of said detection signals from said second and fourth photosensitive regions; and
   said moving means being actuated in response to a focusing signal corresponding to a difference between a sum of said detection signals from said first and second photosensitive regions and a sum of said detection signals from said third and fourth photosensitive regions.

25. An apparatus as in claim 20 further comprising second detector means, mounted on said refractor body.

* * * * *